United States Patent Office 3,007,971
Patented Nov. 7, 1961

3,007,971
PROCESS FOR RECOVERING POLYPHENOLS
Robert H. J. Creighton, Nanaimo, British Columbia, Canada, assignor to MacMillan & Bloedel Limited, Vancouver, British Columbia, Canada, a corporation of British Columbia
No Drawing. Filed Apr. 10, 1959, Ser. No. 805,383
10 Claims. (Cl. 260—619)

This invention relates to the recovery of natural polyphenols from dilute aqueous extracts of plant materials and in particular to the recovery of a phenolic fraction from the hot water extractives of Western Red Cedar (*Thuja plicata*, D. Don) or California Redwood (*Sequoia* sp.). The polyphenols obtainable from these woods constitute a valuable material for use as an addition agent in certain electrolytic processes such as the electrolytic refining of metals, particularly lead.

The heartwood of Western Red Cedar contains from 5–25% of hot water extractable material of which an as yet undetermined mixture of phenolic compounds comprises the largest part. Although the constituents and their structures have not yet been elucidated, it has been established that this phenolic fraction in toto has a high methoxyl content and at least one component contains a free carboxyl group. Compounds containing phenolic groups in the ortho-position to each other are present in the fraction as may be shown by titration with potassium permanganate in the presence of indigo carmine as indicator. (Method for Tannis in Tea, Official Method of A.O.A.C., 7th Ed. (1950), p. 225.) This has been found to be a useful method of assaying aqueous extracts for polyphenol content.

Although the hot water extractive content of Western Red Cedar has been shown, in some cases, to reach 20% or more in the outer heartwood of old growth trees, the average hot water extractive content of chips prepared from whole logs or sawmill waste, such as slabs and edgings, is of the order of 8–10% from trees grown on Vancouver Island, British Columbia. Extraction of wood in finely powdered form, such as a fine sawdust, will yield an extract containing up to 7–8% solids if the extraction is carried out in a multi-stage counter-current system. However, in such a process one is left with a residue of extracted wood that cannot be further processed for pulp production as readily as chips and which is too wet to burn, presenting a major disposal problem as well as failing to provide for maximum utilization of our forest resources.

To overcome this disposal problem, therefore, it would be desirable to carry out the extraction with the wood in chip form rather than in the form of fine sawdust or shavings. Such extracted chips are suitable for further processing by conventional means into pulp or other fibrous products such as hardboard. If the pulping is done by alkaline methods, there is the added advantage in extracting the chips in that a portion of the alkali consuming components of the wood have already been removed.

A disadvantage to the use of chips for the extraction is that, due to the relatively slow rate of diffusion from chips, extract concentrations of only around 1% solids are normally obtained. If the chips are to be subsequently pulped, it may be desirable to carry out the extraction in the digester in which the pulping is to be carried out, but it is uneconomical in most instances to hold up digester space while a prolonged counter-current extraction is carried out in an effort to obtain more concentrated extracts. In practice, therefore, extract concentrations of about 1% solids or less will generally be all that can economically be realized.

With dilute liquors containing about 1% or less of solids, recovery of the dissolved solids can be prohibitively costly. Evaporation costs are high except in very large installations where multi-stage evaporators can be economically installed. As an alternative, the phenolic constituents of the extract may be precipitated by excess lead acetate, but again the cost is high. The simple salts of the phenols with less expensive metals are too soluble to precipitate from dilute solution.

The present invention is based on the discovery that a large part of the phenolic components of the extract can be precipitated in good yield from dilute aqueous extracts as a basic salt of calcium providing the pH of the solution is sufficiently high. The barium or magnesium salts will also precipitate under similar conditions, but yields are considerably lower; calcium hydroxide is therefore the preferred precipitant.

The metal ion may be introduced as the oxide or hydroxide, or in the form of a salt together with an alkali metal hydroxide. The pH of the reaction mixture should be raised to 9 or above and preferably to between 10.5 and 12.8 (measured at 25° C.). With excessive amounts of alkali metal hydroxide, particularly when the pH is brought to 13 or over, the basic salt becomes more soluble and the yield of precipitate drops.

In the preferred procedure calcium may be added either as quick-lime or as slaked lime, preferably as a slurry of freshly slaked lime. The concentration of lime used may vary, but using a freshly slaked lime this optimum level of lime addition has been found to be equivalent to 0.25–0.4 lb. calcium oxide per pound of dissolved solids in a hot water extract. Where the extract is contaminated with sugars or inorganic salts, the optimum level of lime addition in grams per 100 ml. of extract may be calculated by multiplying the permanganate titer of the extract in ml. N/10 $MnO_4$ per ml. of extract by a factor of from 0.2 to 0.3.

The precipitation may be carried out at ambient or at elevated temperatures. In practice it is preferred to carry out the precipitation at or near boiling point of the solution since the precipitate forms more rapidly under these conditions, settles more rapidly and is more readily filtered than when formed at lower temperatures.

The polyphenols may be regenerated from the precipitates in the normal manner by acidification. Conveniently the acid employed is one that will precipitate with the metal of the salt, and sulfuric acid is satisfactory for this purpose when the metal is calcium or barium.

The total hot water extract from Western Red Cedar has been found to be a useful addition agent in the Betts process for the electrolytic refining of lead (Canadian patent application S.N. 705154; U.S. patent application S.N. 650,303, now U.S. Patent 2,877,165 issued March 10, 1959). It has been found that the active principle in hot water extract lies primarily in the polyphenols precipitated by calcium hydroxide according to the process of this invention. It has further been found that the calcium salt so formed may conveniently be used directly in the lead refining process by dissolving in the fluosilicate electrolyte without first springing the phenols from the calcium. Such addition agents function, when used alone or in combination with other addition agents (e.g. goulac), to prevent the formation of undesirable, irregular growths called trees and peanuts. The method by which the cedar phenols accomplish this function, at least in part, is by raising the over-voltage of the cathode as the current density is increased.

In addition to their use as addition agents, the potential usefulness of the phenolic components of the hot water extract as surface active agents, chelating agents, chemical intermediates, and the like, will be recognized by those versed in these arts.

Several advantages are realized by isolating the polyphenols in the manner herein described, as compared to simple evaporation. One of these is that sugars, present in the extract in varying amounts depending on the source material and the conditions of extraction, are not precipitated. The method, therefore, serves to separate the phenols from carbohydrate impurities.

Another advantage is that the extraction of the wood may be carried out under neutral or mildly alkaline conditions (up to pH 9) and still yield a satisfactory electrolytic refining addition agent. The product obtained from a neutral or alkaline extract by simple evaporation, on the other hand, is quite unsatisfactory as such an addition agent. Apart from an increase in yield obtained at pH's above 7, being able to neutralize the strongly acidic components of the extract reduces the severe corrosion of mild steel associated with the hot water extracts from Western Red Cedar. It also reduces the hydrolysis of cellulosic material in the chips which takes place on prolonged extraction at the acid pH reached during simple hot water extraction (pH 2.8–3.0).

The above method of recovering polyphenols from dilute aqueous extracts may be applied to aqueous extracts of plant materials other than Western Red Cedar. Treatment of a hot water extract of California Redwood with lime precipitates the polyphenols in good yield to give a product which can be used as an addition agent in lead refining. Similarly water extracts of tannin- and flavanoid-containing woods and barks can be treated with lime to precipitate a major part of the polyphenols present, although the products obtained are not necessarily useful as addition agents.

EXAMPLE 1

75 ml. of a hot water extract, prepared by extracting cedar pulp chips with water at 215° F. in a laboratory digester and having a permanganate titer of 175 ml. N/10 $KMnO_4$ per 100 ml. of extract was stirred for ten minutes with 2.0 grams of reagent grade calcium hydroxide at room temperature. A tan coloured precipitate formed which was separated by centrifuging. An aliquot of the supernatant liquor was titrated with N/10 $KMnO_4$ and found to have only 23.6% of the original titer.

On repeating the above experiment at 95° C. the residual titer of the supernatant liquor was only 20.3% of the original.

EXAMPLE 2

200 ml. of hot water extract of cedar chips, containing 0.67% solids and having a permanganate titer of 102 ml. per 100 ml. of extract, was treated with freshly slaked lime at various levels of addition. The mixture was stirred for 15 minutes at 95–100° C. and then allowed to settle for 1 hour before filtering through a porous alundum crucible. The salt was dried at 110° C. and then ashed in the muffle at 900° C. The filtrate was checked for pH; then acidified and titrated with N/10 $KMnO_4$.

| Experiment No. | Grams CaO | pH of reaction Mixture | Grams Dry Salt | Grams Ash [1] Free Product | Percent Residual $KMnO_4$ Titer |
|---|---|---|---|---|---|
| 1 | 0.116 | 9.3 | 0.131 | 0.112 | 66.1 |
| 2 | 0.174 | 10.0 | 0.324 | 0.261 | 57.6 |
| 3 | 0.230 | 10.4 | 0.592 | 0.472 | 38.6 |
| 4 | 0.290 | 11.2 | 0.795 | 0.626 | 30.3 |
| 5 | 0.35 | 11.8 | 0.852 | 0.664 | 24.4 |
| 6 | 0.41 | 12.2 | 1.042 | 0.757 | 21.0 |
| 7 | 0.46 | 12.2 | 0.906 | 0.681 | 23.4 |
| 8 | 0.58 | 12.2 | 1.087 | 0.751 | 19.6 |
| 9 | 0.70 | 12.2 | 1.319 | 0.830 | 21.5 |
| 10 | 1.16 | 12.3 | 1.812 | 0.926 | 19.6 |

[1] Grams of dry salt minus ash.

EXAMPLE 3

200 ml. portions of the same extract as used in Example 2 were treated with 0.53 gram of freshly slaked lime and heating and stirring continued for times ranging from 15 to 180 minutes. The hot reaction mixture was then filtered and the experiment continued as in Example 2.

| Experiment No. | Reaction Time (Min.) | Grams Dry Salt | Grams Ash [1] Free Product | Percent Residual $KMnO_4$ Titer |
|---|---|---|---|---|
| 1 | 15 | 1.128 | 0.773 | |
| 2 | 30 | 1.206 | 0.814 | 19.0 |
| 3 | 60 | 1.221 | 0.823 | 19.0 |
| 4 | 90 | 1.281 | 0.884 | 15.0 |
| 5 | 120 | 1.282 | 0.875 | 13.0 |
| 6 | 180 | 1.288 | 0.873 | 15.5 |

[1] Grams of dry salt minus ash.

EXAMPLE 4

200 ml. of the same extract used in Example 2 were treated with $CaCl_2$ in an amount equivalent to 0.58 gram CaO. The mixture was heated to 95–100° C. and 5N NaOH solution added drop-wise until the required pH was reached. After stirring for 15 minutes the precipitates were settled and filtered as in Example 2.

| Experiment No. | Mls. NaOH added | pH | Grams Dry Salt | Grams Ash [1] Free Product | Percent Residual $KMnO_4$ Titer |
|---|---|---|---|---|---|
| 1 | 1.0 | 9.2 | 0.398 | 0.330 | 72 |
| 2 | 1.2 | 10.0 | 0.557 | 0.448 | 43.5 |
| 3 | 1.4 | 10.5 | 0.882 | 0.677 | 25.0 |
| 4 | 1.5 | 11.1 | 0.950 | 0.744 | 25.0 |
| 5 | 1.7 | 11.2 | 1.021 | 0.770 | 24.5 |
| 6 | 2.8 | 12.2 | 1.093 | 0.818 | 24.0 |
| 7 | 5.0 | 12.6 | 1.236 | 0.884 | 20.5 |
| 8 | 7.0 | 12.7 | 1.478 | 0.890 | 25.0 |
| 9 | 8.0 | 12.8 | 1.559 | 0.935 | 26.5 |
| 10 | 10.0 | 12.6 | 1.343 | 0.815 | 28.5 |
| 11 | 15.0 | 12.6 | 1.403 | 0.646 | 48.5 |
| 12 | 50.0 | 13.2 | 0.922 | 0.242 | 54.0 |

[1] Grams of dry salt minus ash.

EXAMPLE 5

50 lbs. of hot water extract, obtained by extracting cedar chips in the laboratory digester at 215° F., and containing 1.22% solids ($KMnO_4$ titer=147 ml. N/10 $KMnO_4$ per 100 ml.) were treated with 115 grams of freshly slaked lime at 50° C. The mixture was stirred for 3 hours then allowed to settle and filtered. 975 grams of wet filter cake were obtained, corresponding to 275 grams of dry salt or 75% of the organic solids plus lime in the original reaction mixture. Titration of aliquots of the wet filter cake and the filtrate with N/10 $KMnO_4$ showed that 75% of the original $KMnO_4$ titratable material had been recovered in the salt while 12.5% remained in the filtrate. The loss of 13% is presumed to be due to oxidative changes during the long period of stirring.

512 grams of wet cake (145 grams dry salt) were suspended in aqueous methanol and acidified to pH 3.0 with sulfuric acid. The calcium sulfate was filtered off and washed. The filtrate and washings were evaporated to dryness yielding 77 grams of cedar phenols as a dark friable solid. This corresponds to a yield of 52.9% of the solids present in the original extract. 94% of the permanganate titratable material in the salt was recovered in the regenerated phenols or 74% of the permanganate titer of the original extract.

Samples of both the calcium salt and the cedar phenols regenerated from it were tested and found to be very good addition agents in the electrolytic refining of lead.

EXAMPLE 6

200 grams of California Redwood (*Sequoia* sp.), ground to pass a 2 mm. screen in a Wiley mill, were extracted twice with a total of 2,200 ml. hot water. The resulting extract had a $KMnO_4$ titer of 138 ml. per 100 ml. of extract and contained 0.84% solids.

1,500 ml. of the above extract were treated with 5.03 grams of freshly slaked lime at 95° C. After 30 minutes the mixture was filtered to yield 37.6 grams of wet cake containing 27.7% solids of 31.4% ash content, and having a $KMnO_4$ titer of 101.4 ml. per gram dry solid.

The above salt when added to a lead fluosilicate electrolyte at a concentration of 0.5 gram dry salt per liter, resulted in a good deposit.

EXAMPLE 7

(a) 4,000 lbs. of cedar chips were charged to a 5,000 gal. open topped tank, along with 2,500 gals. of water. The water was circulated over the chips at the rate of 100–120 gals. per minute and heated to 200–212° F. by the direct injection of steam. Heating and circulation were continued for 8 hours at which point the extract had a permanganate titer of 92 ml. N/10 $KMnO_4$ per 100 ml.

2,000 gals. of the hot extract were pumped to a second tank having a conical bottom and reacted with 45 lbs. of freshly slaked lime. After 30 minutes the salt was allowed to settle and the thickened slurry pumped from the bottom of the cone to a plate and frame filter. The yield of salt was 81 lbs. The salt contained 30.3% ash as CaO and had a permanganate titer of 103 ml. per gram.

(b) When the same operation was carried out except that the pH of the extract was maintained at 5–7 by the periodic addition of 5% solution of sodium carbonate during the extraction of the chips, the extract had a permanganate titer of 110 ml. per 100 ml. and the yield of lime salt was 115 lbs. The salt contained 34% CaO and had a permanganate titer of 98.5 ml. per gram.

(c) The phenols from a portion of the salt from Example 7(a) were regenerated as follows:

100 grams of wet filter cake were suspended in 100 ml. of water and acidified to pH 3.0 with 70 ml. of 25% sulfuric acid. The calcium sulfate was filtered off and washed twice with 100 ml. portions of hot water. The first wash was used to suspend a second 100 gram batch of salt, the second wash was kept and used for the first wash the next time. After four cycles the mother liquor and wash waters had the following composition:

|  | Percent Solid | Ash on Solids | Percent Recovery of Organics in Salt |
| --- | --- | --- | --- |
| Mother Liquor | 10.1 | 7.4 | 76 |
| 1st Wash | 3.6 | 11.3 | 11 |
| 2nd Wash | 1.0 | 26.6 | 3 |

A product of lower ash content could be obtained by treating the mother liquor with barium hydroxide to give a pH of 4–5. After filtering off barium sulfate, excess barium and calcium were removed by acidifying back to pH 2.8 with oxalic acid.

EXAMPLE 8

Run 1

42 tons of Western Red Cedar chips (22.8 tons bone dry wood) were charged to a pulp digester and extracted at 212° F. with 19,000 gals. of water. At the end of 6 hours the liquor was drained from the chips and pumped through a 1,400 gal. stirred tank where it was limed by the continuous addition of slaked lime at a rate to maintain the pH (measured at 25.0) between 11.5–12.0. The overflow from the liming tank was pumped to a second digester which served as a settling tank. The residence time of the slurry in the liming tank was 30–40 minutes. The settled slurry was filtered to yield 1,300 lbs. of salt.

Run 2

In a second run 47 tons of Western Red Cedar chips (20.4 tons B.D. wood) were extracted at a pH of 5–7 by the periodic addition of caustic white liquor during the extraction. Liming and filtration were carried out as in the first run. The yield of salt from the second run was 1,590 lbs.

In both runs, following extraction, the chips were pulped in the normal fashion. Good blows were obtained in each case and the pump produced met specification.

Samples of the extraction and the salt obtained from the extract by liming were tested for their ability to raise the over-voltage of a lead cathode under conditions similar to those used in the electrolytic refining of lead. The extract from run 1 and the salt from both runs 1 and 2, at a concentration of 0.5 gram per liter of electrolyte, produced marked increase in over-voltage. The extract from run 2, on the other hand, at the same concentration, resulted in a much smaller increase in over-voltage and the deposit on the cathode was very rough. The filtrate after separation of the salt from run 1 was only slightly effective on an equivalent solids basis, compared to the salt or the extract, but its effectiveness was roughly proportional to the residual permanganate titer in the filtrate. The filtrate from run 2, on the other hand, was completely ineffective despite the fact that its residual permanganate titer was approximately twice that of the filtrate from run 1, indicating that the impurities responsible for the poor action of extract from run 2 had been left behind in the filtrate on precipitating the phenols with lime.

What I claim as my invention is:

1. A process for recovering polyphenols from aqueous extracts obtained by leaching with water particulate wood selected from the group consisting of Western Red Cedar and California Redwood, which comprises treating the extract with a substance selected from the group consisting of calcium oxide and calcium hydroxide to give a pH of at least 9, and separating the resulting precipitate of the basic calcium salt of the polyphenols of the extract.

2. A process as defined in claim 1 wherein the polyphenols are regenerated from the precipitate by acidification.

3. A process as defined in claim 1 wherein the pH is at least 11.

4. A process as defined in claim 1 wherein the extract is treated with calcium hydroxide.

5. A process as defined in claim 1 wherein the extract is treated with calcium oxide.

6. A process for recovering polyphenols from aqueous extracts obtained by leaching with water particulate wood selected from the group consisting of Western Red Cedar and California Redwood, which comprises treating the extract with a soluble salt of calcium and with an alkali metal hydroxide in an amount to give a pH of from 9 to 12.8, and separating the resulting precipitate of the basic calcium salt of the polyphenols of the extract.

7. A process for recovering polyphenols from aqueous extracts obtained by leaching with water particulate wood selected from the group consisting of Western Red Cedar and California Redwood, which comprises treating the extract with a soluble salt of calcium and with sodium hydroxide in an amount to give a pH of from 9 to 12.8, and separating the resulting precipitate of the basic calcium salt of the polyphenols of the extract.

8. A process for recovering polyphenols from particles of wood selected from the group consisting of Western Red Cedar and California Redwood, which comprises extracting the wood particles with water containing sufficient alkali to maintain the pH appreciably above that which would be obtained in the absence of alkali but below 9.0, treating the extract with calcium hydroxide in an amount sufficient to bring the pH to at least 10, and separating the resulting precipitate of the basic calcium salt of the polyphenols of the extract.

9. A process as defined in claim 8 wherein the polyphenols are regenerated from the precipitate by acidification with sulfuric acid.

10. A process for recovering polyphenols from particles of a wood selected from the group consisting of Western Red Cedar and California Redwood, which comprises extracting the wood particles with water containing sufficient alkali to maintain the pH appreciably above that which would be obtained in the absence of alkali but below 9.0, treating the extract with calcium oxide in an amount sufficient to bring the pH to at least 10, and separating the resulting precipitate of the basic calcium salt of the polyphenols of the extract.

References Cited in the file of this patent

UNITED STATES PATENTS

| | | |
|---|---|---|
| 2,334,564 | Lewis | Nov. 16, 1943 |
| 2,483,505 | Rogers et al. | Oct. 4, 1949 |
| 2,782,241 | Gray et al. | Feb. 19, 1957 |
| 2,877,165 | Turner | Mar. 10, 1959 |